(12) United States Patent
Triandopoulos et al.

(10) Patent No.: US 9,813,243 B1
(45) Date of Patent: Nov. 7, 2017

(54) METHODS AND APPARATUS FOR PASSWORD-BASED SECRET SHARING SCHEMES

(71) Applicant: EMC IP Holding Company LLC, Hopkinton, MA (US)

(72) Inventors: Nikolaos Triandopoulos, Arlington, MA (US); Ronald Rivest, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/672,507

(22) Filed: Mar. 30, 2015

(51) Int. Cl.
 *H04L 29/06* (2006.01)
 *H04L 9/30* (2006.01)
 *H04L 9/08* (2006.01)

(52) U.S. Cl.
 CPC .......... *H04L 9/3093* (2013.01); *H04L 9/0869* (2013.01); *H04L 9/08* (2013.01); *H04L 9/30* (2013.01); *H04L 63/083* (2013.01); *H04L 2209/24* (2013.01)

(58) Field of Classification Search
 CPC ..... H04L 9/3093; H04L 9/0869; H04L 9/008; H04L 9/30; H04L 9/08; H04L 63/083
 See application file for complete search history.

(56) References Cited

U.S. PATENT DOCUMENTS 7,224,806 B2 * 5/2007 Eskicioglu .............. H04L 9/085
  348/E7.056
2003/0091192 A1 * 5/2003 Chen .................... H04L 63/0457
  380/277
2004/0030932 A1 * 2/2004 Juels ..................... H04L 63/083
  713/151

(Continued)

OTHER PUBLICATIONS

Bagherzandi et al. Password-Protected Secret Sharing, in Proceedings of the 18th ACM Conference on Computer and Communications Security, CCS'11, pp. 443-444, New York, NY, USA, 2011, ACM.

(Continued)

*Primary Examiner* — Mohammad A Siddiqi
(74) *Attorney, Agent, or Firm* — Ryan, Mason & Lewis, LLP (57) ABSTRACT

Methods and apparatus are provided for password-based secret sharing. An exemplary method comprises obtaining a secret; obtaining a fixed value from at least one party; setting at least one polynomial coefficient of a polynomial employed by a polynomial-based secret sharing scheme to a value that depends on the fixed value and the secret; and applying the polynomial-based secret sharing scheme to the secret to obtain a plurality of secret shares, wherein the plurality of secret shares comprises at least one fixed share derived from the at least one polynomial coefficient. Another exemplary secret sharing method comprises selecting at least one fixed share of a plurality of shares employed by an additive secret sharing scheme that splits the secret into the plurality of shares needed for reconstruction of the secret, wherein the at least one fixed share depends on the fixed value; and setting at least one masked version of the secret employed by the additive secret sharing scheme, wherein the at least one masked version of the secret depends on the at least one fixed share.

25 Claims, 3 Drawing Sheets

(56) References Cited

U.S. PATENT DOCUMENTS

| | | | | |
|---|---|---|---|---|
| 2004/0165726 | A1* | 8/2004 | Yamamichi | H04L 9/085 380/277 |
| 2010/0086228 | A1* | 4/2010 | Cho | G01S 13/9035 382/255 |
| 2012/0198241 | A1* | 8/2012 | O'Hare | G06F 21/602 713/189 |
| 2013/0216044 | A1* | 8/2013 | Gentry | H04L 9/008 380/277 |
| 2015/0172258 | A1* | 6/2015 | Komano | H04L 9/0816 380/259 |
| 2016/0119119 | A1* | 4/2016 | Calapodescu | H04L 9/008 380/30 |

OTHER PUBLICATIONS

Beimel, Secret-sharing Schemes: A Survey. In YeowMeng Chee, Zhenbo Guo, San Ling, Fengjing Shao, Yuansheng Tang, Huaxiong Wang, and Chaoping Xing, editors, Coding and Cryptology, vol. 6639 of Lecture Notes in Computer Science, pp. 11-46. Springer Berlin Heidelberg, 2011.

Benaloh et al. Generalized Secret Sharing and Monotone Functions, in Proceedings on Advances in Cryptology, Crypto '88, pp. 27-35, New York, NY, USA, 1990. Springer-Verlag New York, Inc.

Emura et al. Ideal Secret Sharing Schemes with Share Selectability, in Information and Communications Security, 13th International Conference, ICICS 2011, Beijing China, Nov. 23-26, 2011. Proceedings, pp. 143-157, 2011.

Ito et al. Secret Sharing Schemes Realizing General Access Structure, in Proceedings of the IEEE Global Telecommunication Conference, Globecom 1987, pp. 99-102, 1987.

Ito et al. Multiple Assignment Scheme for Sharing Secret, Journal of Cryptology, 6(1):15-20, 1993.

U.S. Appl. No. 14/319,276, filed Jun. 30, 2014, entitled, "System and Method for Key Material Protection on Devices Using a Secret Sharing Scheme."

U.S. Appl. No. 14/577,206, filed Dec. 19, 2014, entitled, "Protection of a Secret on a Mobile Device Using a Secret-Splitting Technique with a Fixed User Share."

Shamir, How to Share a Secret, Commun. ACM. 22(11):612-613, Nov. 1979.

Stajano, Pico: No More Password! In Bruce Christianson, Bruno Crispo, James Malcolm, and Frank Stajano, editors, Security Protocols XIX, vol. 7114 of Lecture Notes in Computer Science, pp. 49-81. Springer Berlin Heidelberg, 2011.

* cited by examiner

THRESHOLD PASSWORD-BASED SECRET SHARING PROCESS (ONE FIXED SHARE):

1. PROCESS SINGLE PASSWORD SHARE
2. INITIALIZE POLYNOMIAL
3. RANDOMIZE POLYNOMIAL PARTIALLY ACCORDING TO NUMBER OF FIXED SHARES
4. ESTABLISH SECRET-RECONSTRUCTION CONDITION
5. ESTABLISH FIXED-SHARE CONDITION FOR SINGLE FIXED SHARE
6. PRODUCE FINAL SHARES

THRESHOLD PASSWORD-BASED SECRET SHARING PROCESS ($k$ FIXED SHARES):

1. PROCESS $k$ FIXED SHARES
2. INITIALIZE POLYNOMIAL
3. RANDOMIZE POLYNOMIAL PARTIALLY ACCORDING TO NUMBER OF FIXED SHARES
4. ESTABLISH CONDITIONS FOR SECRET RECONSTRUCTION AND $k$ FIXED SHARES
5. PRODUCE FINAL SHARES

GENERIC PASSWORD-BASED SECRET SHARING PROCESS

1. ESTABLISH FIXED AND NON-FIXED SHARES
2. PRODUCE TUPLE FOR ADDITIVE SHARING
3. PRODUCE FINAL SHARES

METHODS AND APPARATUS FOR PASSWORD-BASED SECRET SHARING SCHEMES

CROSS-REFERENCE TO RELATED APPLICATIONS

The present application is related to U.S. patent application Ser. No. 14/319,276, filed Jun. 30, 2014, entitled "System and Method for Key Material Protection on Devices Using a Secret Sharing Scheme;" (Now U.S. Pat. No. 9,461,821); and U.S. patent application Ser. No. 14/577,206, filed Dec. 19, 2014, entitled "Protection of a Secret on a Mobile Device Using a Secret-Splitting Technique with a Fixed User Share," (Now U.S. Pat. No. 9,455,968), each incorporated by reference herein.

FIELD

The present invention relates to the protection of secret keys and other information in devices.

BACKGROUND

Secret sharing schemes comprise a cryptographic tool for implementing secure distributed protocols. They allow a secret to be split into a number of randomly produced pieces, or shares, and their distribution to corresponding entities during a secret sharing phase, such that this split secret may become again available, during a secret reconstruction phase, only by combining a number of these shares that satisfy some well-defined conditions.

In certain settings it is useful that one or more of the shares are chosen according to some external criteria (e.g., independently of the secret being split or the secret sharing method itself). Thus, techniques have been proposed or suggested for extending secret sharing schemes to support sharing of secrets into shares so that one or more shares take on some predetermined fixed values and not arbitrary values that are randomly chosen during the secret sharing phase. For example, U.S. patent application Ser. No. 14/577,206, filed Dec. 19, 2014, entitled "Protection of a Secret on a Mobile Device Using a Secret-Splitting Technique with a Fixed User Share," (Now U.S. Pat. No. 9,455,968), discloses the use of "fixed shares" for enabling flexible reconstruction policies of keys split using the well-known Shamir's sharing scheme that allow for the use of one or more user-defined shares (e.g., a password) during key reconstruction.

A need remains for improved secret sharing schemes that support selection of predetermined fixed shares without affecting the security of the underlying secret sharing schemes. Another need exists for improved secret sharing schemes that support selection of predetermined fixed shares as well as restrictions on the use of such predetermined fixed shares that improve the usability and/or the security of the underlying secret sharing schemes.

SUMMARY

Illustrative embodiments of the present invention provide methods and apparatus for password-based secret sharing. According to one aspect of the invention, an exemplary method comprises obtaining a secret; obtaining a fixed value from at least one party, such as secret information or a password of the at least one party; setting at least one polynomial coefficient of a polynomial employed by a polynomial-based secret sharing scheme to a value that depends on the fixed value and the secret; and applying the polynomial-based secret sharing scheme to the secret to obtain a plurality of secret shares, wherein the plurality of secret shares comprises at least one fixed share derived from the at least one polynomial coefficient.

According to one aspect of the invention, an exemplary secret sharing method comprises obtaining a secret; obtaining a fixed value from at least one party; selecting at least one fixed share of a plurality of shares employed by an additive secret sharing scheme that splits the secret into the plurality of shares needed for reconstruction of the secret, wherein the at least one fixed share depends on the fixed value; and setting at least one masked version of the secret employed by the additive secret sharing scheme, wherein the at least one masked version of the secret depends on the at least one fixed share.

A number of exemplary reconstruction configurations are also disclosed for the generic password-based secret sharing scheme. In one exemplary implementation, a plurality of parties in a given authorized set are provided with auxiliary information comprising a unique nonce and the at least one masked version of the secret, wherein the plurality of parties in the given authorized set jointly unmask the secret. In another secret reconstruction variation, each party in a minimal set of parties needed to reconstruct the secret can decrypt the at least one masked version of the secret by incrementally removing one or more mask values from a current masked version of the secret to recover the secret. In yet another secret reconstruction variation, a plurality of parties in a given authorized set are provided with auxiliary information comprising a unique nonce, wherein each of the plurality of parties in the given authorized set provide a derived share to a reconstructor entity possessing the at least one masked version of the secret for reconstruction of the secret.

Embodiments of the invention can be implemented in a wide variety of different devices and applications for the protection of key material or other protected material using password-based secret sharing schemes.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown.

Aspects of the invention provide a number of exemplary secret sharing schemes, collectively referred to herein as password-based secret sharing schemes. An exemplary threshold password-based secret sharing scheme and an exemplary generic password-based secret sharing scheme are provided. In at least some embodiments of the invention, the disclosed exemplary password-based secret sharing schemes achieve the property of securely supporting selection of predetermined fixed shares. A predetermined fixed share is associated with a fixed value from a user, such as a user's password.

Secret Sharing Schemes

A secret sharing scheme is a pair of algorithms (Share, Rec) that allow the sharing of a secret Y into a number of shares, or sharing, $S=\{s_1, s_2, \ldots, s_n\}$, which are distributed to a number of entities, or parties, $P=(\{p_1, p_2, \ldots, p_{n'}\}, n' \leq n$, so that each party collectively receives at least one share, such that reconstruction of secret Y is allowed from at least one subset of shares, only under certain conditions on this subset being met. Such conditions on subsets of shares that allow secret reconstruction may depend on the subset size or generally on the exact members of the subset, i.e., on the exact combination of shares and, therefore, on a corresponding combination of parties. These conditions are typically expressed by an access structure (AS) that characterizes the exact subsets of shares, or corresponding subset of parties, that allow reconstruction of the secret for a given scheme. Any such subset in the access structure of a scheme is often called an authorized set of shares or parties. Then, a secret sharing scheme should necessarily limit secret reconstruction only to authorized sets in its access structure and disallow secret reconstruction from any subset of shares or parties not in its access structure.

Generally, a secret sharing scheme can support an arbitrary such set of conditions defined by the access structure AS containing authorized sets of parties that result from any set-operation formula over the parties in $P=\{p_1, p_2, \ldots, p_{n'}\}$. For example, $$AS=\{\{p_1 \cup p_2\}, \{(p_1 \cup p_2 \cup p_3) \cap (p_2 \cup p_3 \cup p_n)\}\}.$$

Often, for secret sharing to be more efficient and secret reconstruction conditions to be meaningful, the access structure should be expressed by a monotone formula, so that, for example, if subset $\{p_2, p_3\}$ is included in AS, then all proper supersets of it are also included. For such a monotone access structure, an authorized set $A_i$ is called minimal if any proper subset of $A_i$ is not an authorized set. For instance, set $\{p_2, p_3\}$ in the above example is minimal when the access structure additionally requires at least two parties for secret construction.

Generic Schemes

Generic secret sharing schemes for general monotone access structures are known to exist. See, for example, J. Benaloh and J. Leichter, "Generalized Secret Sharing and Monotone Functions," Proc. on Advances in Cryptology, CRYPTO '88, pages 27-35 (1990); M. Ito et al., "Multiple Assignment Scheme for Sharing Secret," J. of Cryptology, Vol. 6, No. 1, 15-20 (1993); and/or M. Ito et al., "Secret Sharing Schemes Realizing General Access Structure," Proc. of the IEEE Global Telecommunication Conference, Globecom 1987, pages 99-102 (1987).

For example, the two referenced schemes by M. Ito et al. support a general monotone access structure AS by separately masking the shared secret Y for each authorized set $A_i \in AS$ as follows: One or more "mask" shares $R_{i_j}$, one for all but one of the parties in the authorized set $A_i=\{p_{i_1}, p_{i_2}, \ldots, p_{i_l}\}, l \geq 2$, are randomly and independently selected and exclusive or-ed (XORed) with Y, through an XOR operation denoted herein by additive operation $\oplus$, consistently with the reconstruction constraint $Y=\oplus_{1 \leq j \leq l} R_{i_j}$, so that any sum over operation $\oplus$ of the secret Y with one or more "mask" shares $R_{i_j}$ comprises a masked version of secret Y. In essence, for each authorized set $A_i$ of size l, the secret Y is split, using an additive sharing scheme, into l shares, called additive shares, that are related to Y through XORing (or generally an addition operation, defined in the appropriate group and denoted herein also by $\oplus$), where all l shares are needed for reconstruction. Then, party $p_k \in P$, $k \in [1:n']$, is provided with one such additive share for each authorized set $A_i$ that $p_k$ belongs to, that is, with the following set:

$$S_k = \{R_{i, \phi(k,i)} | A_i \in AS, p_k \in A_i\},$$

where function $\phi(k,i)$ returns the rank of $p_k \in A_i$ in set $A_i=\{p_{i_1}, p_{i_2}, \ldots, p_{i_l}\}$ (according to a fixed total ordering among parties), defined as $\phi(k,i)=j$ if $A_i=\{p_{i_1}, p_{i_2}, \ldots, p_{i_l}\}$ and $p_k=p_{i_j}$, $1 \leq j \leq l$, or $\phi(k,i)=0$ otherwise.

Existing generic schemes of the above design paradigm are both ideal (that is, each share has a size that is exactly the size of the secret) and perfectly private (that is, any unauthorized set learns nothing about the secret in an information-theoretic sense). However, the total size of the shares provided to a party may well exceed the size of the split secret, as it typically proportionally depends on the number of authorized sets that the party belongs to.

Similarly, the above-referenced scheme by Benaloh and Leichter recursively applies additive secret sharing to a collection of elementary access structures (or authorized sets) and a collection of secondary access structures (or authorized sets) defined as the intersection of elementary access structures, with the overall goal of removing redundancies among the elementary access structures and, thus, reducing the total number of shares used in the scheme. For example, a secret Y can be shared to secondary authorized set $A_1 \wedge A_2$ defined over elementary sets $A_1=\{p_1, p_2, p_3\}$ and $A_2=\{p_2, p_3, p_4\}$ by first choosing randomly and independently secrets $Y_1$ and $Y_2$ such that $Y=Y_1 \oplus Y_2$ (or $Y=Y_1+Y_2$ mod m if secrets come from the domain $0, 1, \ldots, m-1$) and then additively sharing $Y_1$ and $Y_2$ to sets $\{p_1, p_2, p_3\}$ and $\{p_2, p_3, p_4\}$, respectively. Then, only members of $A_1 \wedge A_2$ can reconstruct "sub-secrets" $Y_1$ and $Y_2$, both of which are needed for the reconstruction of secret Y, and such recursive scheme can generally lead to efficiency improvements compared to the "flat" generic scheme by M. Ito et al. discussed above.

Threshold Schemes

Threshold secret sharing schemes, on the other hand, are special schemes with corresponding access structures where reconstruction depends only on the number of available parties (or combined shares), namely, by including only authorized sets of size that exceeds at least a given threshold value. Specifically, in a typical (t,n) or t-out-of-n secret sharing scheme, $2 \leq t \leq n$, the secret is split into n shares where each party $p_i$ is provided with exactly one share $s_i$, and secret reconstruction is allowed by any set of parties (equivalently, set of shares) of size t or more, that is, any set reaching a size of the reconstruction threshold value t.

Shamir's secret sharing scheme is the most widely used threshold scheme and is based on polynomials. For a description of Shamir's secret sharing scheme, see, for example, Adi Shamir, "How to Share a Secret," Commun. ACM, Vol. 22, No. 11, 612-613 (November 1979), incorporated by reference herein.

Under Shamir's secret sharing scheme, given a secret Y in the appropriate range, a random polynomial f(.) of degree t−1 is chosen by selecting randomly and independently t−1 polynomial coefficients so that f(0)=Y, where arithmetic modulo a (large) prime of an appropriate length is used to evaluate the polynomial, and the produced sharing takes the form S={$s_i$=(i,f(i))|i∈ [1: n]}. Then, secret reconstruction is allowed through polynomial interpolation (and evaluation of f(0)) for any subset of shares of size at least t, based on the fact that any k points uniquely define a polynomial of degree (at most) k−1 passing through all these points. Shamir's scheme is both ideal (that is, each share is of size exactly the size of the secret) and perfectly private (that is, any unauthorized set of at most t−1 shares learns nothing about the secret in an information-theoretic sense).

The XOR-based additive secret sharing scheme discussed above is essentially a (n,n) or n-out-of-n threshold scheme.

Overview of Disclosed Sharing Schemes

As noted above, aspects of the invention provide a number of secret sharing schemes, collectively referred to herein as password-based secret sharing schemes. In various embodiments of the invention, the exemplary password-based secret sharing schemes achieve the property of securely supporting selection of predetermined fixed shares. A predetermined fixed share is associated with a predetermined fixed value, such as a user's password.

Threshold Scheme

Figure 1:
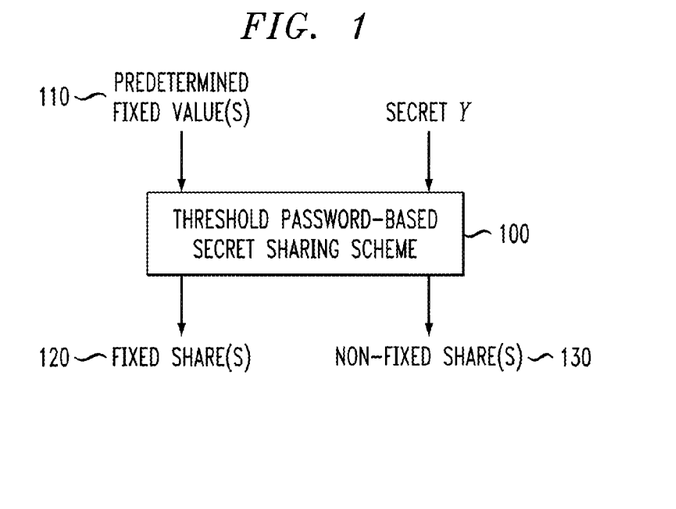
FIG. 1 illustrates a threshold password-based secret sharing scheme 100 that incorporates aspects of the invention.

FIG. 1 illustrates a threshold password-based secret sharing scheme 100 that incorporates aspects of the invention. The exemplary threshold password-based secret sharing scheme 100 extends Shamir's (t,n) threshold secret sharing scheme to allow the secure selection of one or more shares, referred to as fixed shares 120. The fixed shares 120 are selected in accordance with one or more corresponding predetermined fixed values 110, that are provided as inputs to the exemplary threshold password-based secret sharing scheme 100, in addition to the secret, Y. In addition, the exemplary threshold password-based secret sharing scheme 100 generates one or more non-fixed shares 130, as discussed further below in conjunction with FIGS. 3 and 4.

The selected fixed shares 120 are fully consistent with the secret reconstruction condition and the extended threshold-based scheme 100 remains both ideal and perfectly private in at least one exemplary embodiment. This is in contrast with the standard Shamir's scheme, where all shares are randomly selected only subject to the secret reconstruction condition f(0)=Y.

As discussed further below in conjunction with FIGS. 3 and 4, introducing one or more (up to an upper bound that depends on n and t) fixed shares 120 in Shamir's (t,n) scheme, while keeping its ideal sharing and perfect privacy properties, is possible by appropriately adjusting the underlying polynomial in a way that maintains the consistency between the fixed shares 120 and the secret reconstruction condition. The disclosed exemplary threshold password-based secret sharing scheme 100 carefully trades the selection of fixed shares 120 (according to corresponding predetermined fixed values) with a corresponding adjustment of the polynomial coefficients. Such adjustments maintain the exemplary scheme's secure configuration, that is, to ensure that the secret, Y, remains both reconstructable and hidden from any below-the-threshold coalition. Specifically, every additional fixed share 120 that is introduced in the scheme is "tolerated," with respect to the two goals of secret reconstruction and perfect privacy, by appropriately setting a corresponding polynomial coefficient to a particular value that (among other factors) depends on the fixed share 120.

The exemplary threshold password-based secret sharing scheme 100 is the first known technique to securely support selection of fixed shares for Shamir's scheme.

Generic Scheme

Figure 2:
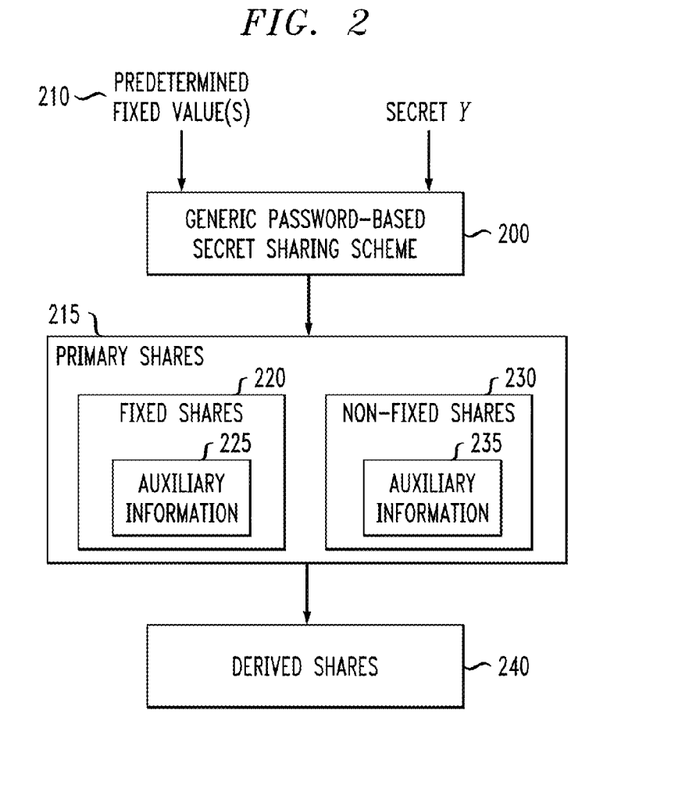
FIG. 2 illustrates a generic password-based secret sharing scheme 200 that incorporates aspects of the invention.

FIG. 2 illustrates a generic password-based secret sharing scheme 200 that incorporates aspects of the invention. As shown in FIG. 2, the exemplary generic password-based secret sharing scheme 200 generates a set of primary shares 215. The primary shares 215 are partitioned into fixed shares 220 and non-fixed shares 230, as discussed further below. Each primary share 215 (fixed or non-fixed) is used to derive one or more derived shares 240, where each derived share 240 corresponds to a particular minimal authorized set, $A_i$, and also depends on a unique nonce for this set, as discussed further below. The derived share 240 is an additive share in the additive sharing that splits the secret for this authorized set. In an exemplary implementation of the disclosed generic password-based secret sharing scheme 200, a party stores only one primary share 215, possibly augmented with auxiliary information related to each of the minimal authorized sets to which the party belongs, and derives the derived shares 240 on demand, assuming that the party learns the corresponding nonce.

The exemplary generic password-based secret sharing scheme 200 is an extension of existing generic secret sharing schemes that allows selection of one or more fixed shares 220 in accordance with a set of corresponding fixed values 210 (provided as inputs to the generic password-based secret sharing scheme 200 in addition to the secret, Y). Specifically, a generic secret sharing scheme 200 is provided that, similarly to existing schemes, supports a general access structure AS and is based on additive shares $R_{i_j}$, combined through XORing (or some other additive operation ⊕ defined over the appropriate group) for secret reconstructing as Y=$⊕_{1≤j≤l}R_{i_j}$ by each authorized set $A_l$∈AS, but additionally allows selection of one or more (up to an upper bound that depends on the size of 4) of these additive fixed shares 220 that depend on corresponding predetermined fixed values 210.

As discussed further below in conjunction with FIG. 5, the fixed shares 220 are selected for one or more parties in a way that depends on a corresponding predetermined fixed value 210 that is related to a given party (e.g., corresponding to user-defined secret information). The fixed shares 220 can optionally also comprise auxiliary information 225. In addition, one or more non-fixed shares 230 are selected for one or more additional parties, wherein the one or more non-fixed shares 230 comprise a κ-bit string and auxiliary information 235. The optional auxiliary information 225 or 235 further comprises one or more unique nonce values, where each nonce value is related to a particular minimal authorized set, and optionally one or more masked versions of the secret, where each masked version is also related to a particular minimal authorized set.

The fixed shares 220 also comprise a κ-bit string. While the bits of the κ-bit string of the non-fixed shares 230 are randomly selected, the bits of the κ-bit string of the fixed shares 220 are selected in accordance with the provided predetermined fixed values 210.

The fixed shares 220 are fully consistent with the secret reconstruction condition for a given authorized set and the extended scheme 200 remains both ideal and private, although privacy in this case becomes computational rather than informationally theoretic, in at least one exemplary embodiment. Again, this is in contrast with existing known generic schemes where all additive shares for a given authorized set are randomly selected only subject to the secret reconstruction condition for this set (e.g., that all shares XOR to Y or $Y = \oplus_{1 \le j \le l} R_{i_j}$).

Unlike the threshold password-based secret sharing scheme 100 of FIG. 1, known generic schemes offer no additional degrees of freedom (for example, offered by the polynomial coefficients in the previous case) that can be appropriately adjusted in a way that maintains the consistency between the selected additive shares and the secret reconstruction condition. In other words, in a generic scheme, the same design technique cannot be directly applied, described above in conjunction with FIG. 1, for trading the selection (according to some predetermined fixed values) of a number of additive shares (in the sharing of a given authorized set) with the adjustment of some randomness parameters on a generic scheme. A natural alternative would be to trade selected shares directly with other non-selected shares, where the latter take on other "correction" values to "tolerate" the former, but this would (1) limit the total number of parties for which selected shares are allowed in a given authorized set and also (2) introduce correlations between selected and "correction" shares, both within a given authorized set (as every selected share is paired with a "correction" one) but, importantly, also across different authorized sets (as all of a party's selected shares depend on the same predetermined fixed values), thus possibly severely affecting the security of the scheme.

The disclosed generic password-based secret sharing scheme 200 decouples each party's primary share from the reconstruction condition $Y = \oplus_{1 \le j \le l} R_{i_j}$ by introducing one or more derived shares. Here, primary shares are the ones that are distributed to the parties and that can be optionally selected according to some predetermined fixed values whereas derived shares are, as their name denotes, the ones that are derived by primary shares and that are used as additive shares (i.e., as "mask" shares used in the additive secret sharing of a given authorized set to mask the secret).

Specifically, each party $p_k \in P$ has a unique primary share $s_k$ that is either randomly selected, comprising a primary non-fixed share that becomes part of the non-fixed shares 230, or selected according to a predefined fixed value, comprising a primary fixed share that becomes part of the fixed shares 220. Derived shares 240 are derived by primary shares (fixed or non-fixed) through a symmetric-key encryption layer as follows. For each set $A_i$ such that $p_k \in A_i$, one derived share $R_i = E_{s_k}(r_i)$ is produced for $p_k$ as the semantically-secure encryption of nonce value $r_i$ that is specific to set $A_i$, unique for the entire scheme, randomly produced and not necessarily secret, under key $s_k$, that is, using as key the primary share of party $p_k$. In an exemplary implementation of the disclosed generic password-based secret sharing scheme 200, only the primary (fixed or non-fixed) share 215, $s_k$, is stored by party $p_k$. In an alternative exemplary implementation of the disclosed sharing scheme 200, if the primary share is fixed, then derived share 240 computed as $R_i = E_{s_k}(r_i)$, which can be also considered fixed, becomes also part of the fixed shares 220 and is stored by party $p_k$, and similarly, if the primary share is non-fixed, then derived share 240 computed as $R_i = E_{s_k}(r_i)$ is, which can be also considered non-fixed, becomes also part of the non-fixed shares 230 and is stored by party $p_k$. Finally, for a given set $A_i = \{p_{i_1}, p_{i_2}, \ldots, p_{i_l}\}$, the corresponding derived shares $R_{i,j} = E_{s_{i_j}}(r_i)$ for all j (that is, all parties) in set $A_i$, serve as additive shares to mask the secret Y in a similar manner to what has been described above. Advantageously, in an exemplary implementation of the disclosed generic password-based secret sharing scheme 200, the introduced encryption layer that derives derived shares from primary shares also helps in reducing the total number of shares stored in the scheme, since the actual shares stored by the parties is only one primary share $s_k$ per party $p_k$, independently of the number of authorized sets in the access structure, since additive shares can be derived on demand as encryptions under the primary shares of the corresponding fresh nonce values. In this case, party $p_k \in A_i$ may serve as an oracle, which on input a nonce $r_i$ (and possibly some additional information specific to $A_i$), during secret reconstruction by authorized set $A_i$, returns the corresponding additive share $R_i = E_{s_k}(r_i)$, where $s_k$ may depend on some predetermined fixed value. Different reconstruction configurations are also possible as it will be presented below.

Motivating Application

Password-based secret sharing finds application to the problem of credential protection in mobile settings. Protecting sensitive data that is stored in mobile devices or accessed through mobile devices is a fundamental security problem. Users store, access, process and manage high volumes of personal or enterprise data through their mobile devices, and this data must be protected against leakage to unauthorized parties due to partial or full compromise of the device by an attacker. For example, if a user's device is lost or stolen, or if the user's device gets infected by some malicious software, or even if a malicious party gets temporary access to the device, the user's sensitive data stored in the device or accessed through this device should remain protected. In particular, user's data should maintain its confidentiality and integrity even when an attacker gains possession of the device's secret state.

Secure data protection in mobile settings entails certain challenges. On one hand, for better security, data should be hardened by the use of cryptographic tools (e.g., encryption for data confidentiality), where strong keys must be generated, used and managed for this purpose. However, these keys must themselves be protected, and key protection in mobile setting introduces more challenges. If keys are stored locally, they are prone to leakage from a possible compromise of the device's secret state (e.g., after a loss or theft of the device or by installing malware on it).

Alternatively, if the devices are managed through cloud-based services, access to the data they protect is restricted to operational settings that require connectivity to a cloud server in order to retrieve the keys, which, in turn, may introduce severe performance or usability issues (e.g., for establishing a secure connection with the server).

On the other hand, for better usability, access to data should be controlled in ways that require less or no user involvement and incur no usage distraction. If keys are associated with password-protected credentials or if they are replaced altogether by passwords, then security and usability are both negatively affected, since passwords tend to have low entropy and thus be susceptible to online or offline dictionary attacks, and also the user is distracted by being asked to frequently enter a password or PIN. Additionally, password-based protection of mobile data limits the possibility for flexible access control structures, since the user cannot remember too many passwords that control access to different types of protected data. Recently, solutions based on secret sharing schemes have been proposed to address some of the above challenges in secure data protection in mobile devices.

The key solution concept is to employ one cryptographically strong key for protecting sensitive data, where this key is split into two or more shares dispersed amongst a set of devices, such as mobile devices, smart objects and online servers. Then, granting access to data protected by such a split key requires reconstructing this key by requesting, collecting, and cryptographically combining an appropriate subset of such key. Share collection may be further controlled by other user/device authentication and authorization mechanisms (e.g., using a password as a secret share or downloading a share from an online server may require explicit or implicit user authentication first).

If Shamir's (t,n) threshold secret sharing scheme is used for splitting the key into n shares, a combination of any t, or more, such shares is necessary to reconstruct the key. In this key-splitting setting, U.S. patent application Ser. No. 14/319,276, filed Jun. 30, 2014, entitled "System and Method for Key Material Protection on Devices Using a Secret Sharing Scheme," (Now U.S. Pat. No. 9,461,821) discloses a technique that is based on wrapping of shares for enabling flexible reconstruction policies of keys split using a threshold sharing scheme (e.g., Shamir's scheme) that are more general than just threshold conditions of the form "t-out-of-n." As noted above, U.S. patent application Ser. No. 14/577,206, filed Dec. 19, 2014, entitled "Protection of a Secret on a Mobile Device Using a Secret-Splitting Technique with a Fixed User Share," (Now U.S. Pat. No. 9,455,968) discloses the use of "fixed shares" for enabling flexible reconstruction policies of keys split using Shamir's sharing scheme that allow for the use of one or more user-defined shares (e.g., a password) during key reconstruction.

Therefore, collectively, the above solution concepts combined with any password-based secret sharing scheme of the present invention allows for the design of a secure container for protecting mobile data as follows. Data is encrypted using some strong secret key, which is split into sufficiently many shares, including at least one password share. Then, security is advanced by distributing shares to the appropriate entities and achieving better intrusion resilience, and usability is advanced by allowing flexible reconstruction policies that are user-transparent or not depending on the operational context.

For example, if a (2,3) threshold password-based secret sharing scheme is employed with one password share (derived by a password remembered by the user), one device share (stored at the device) and one server share (stored at an online server), then security is hardened because an attacker needs to compromise (i) both the device and the server, or (ii) either the device or the server, and then obtain the user's password, in order to gain unauthorized access to the user's data. Also, usability is improved by allowing user-agnostic data access, through reconstruction of the key, performed at the device, using the device and server shares, when the device is online (i.e., has network connectivity with the online server), while still allowing undisrupted data access in cases where the device is offline (e.g., while operating in "airplane" mode), through reconstruction, performed at the device, using the password and the device shares.

Threshold Password-Based Secret Sharing Scheme

Consider a concrete example, where only one share is fixed to a predetermined value (although in the general case, multiple fixed shares can be employed, as discussed further below in conjunction with FIG. 4). Consider Shamir's (3,5) threshold scheme, where secret Y is shared among parties $P=\{p_1, p_2, p_3, p_4, p_5\}$ through sharing $S=\{s_1, s_2, s_3, s_4, s_5\}$, where any three or more shares suffice to reconstruct Y, but no pair of shares alone. Let p be the prime order of the finite field $Z_p$ over which the polynomials in Shamir's scheme are defined, where Y<p. One predetermined fixed share, say $s_1$, can be selected that is associated with the secret information of party $p_1$. For example, a password π is first selected by party $p_1$ and then the associated share $s_1$ is computed by applying an appropriate transformation function, e.g., mapping π to an element in $Z_p$.

Secret Sharing

Shamir's scheme is extended herein so that $s_1$ can be securely associated with π and, at the same time, Shamir's scheme remains ideal and perfectly private in at least one exemplary embodiment.

Figure 3:
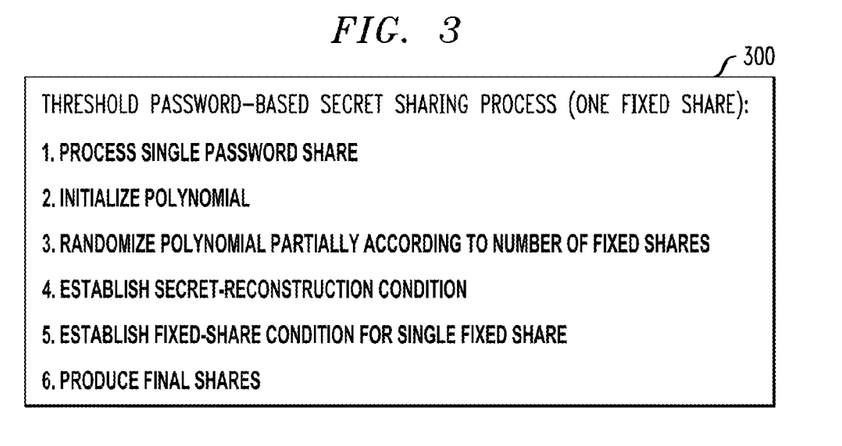
FIGS. 3 and 4 are flow charts illustrating exemplary alternative implementations of a password-based threshold secret sharing process.

FIG. 3 is a flow chart illustrating an exemplary implementation of a password-based threshold secret sharing process 300 for the case of a single fixed share. As shown in FIG. 3, the exemplary password-based threshold secret sharing process 300 comprises the following steps.

1. Password Share: Map password π to an element $\Pi=h(\pi)\in Z_p$ by applying an appropriate compressed-range function h: $\{0,1\}^* \to \{Z_p\}$. Here, function h may be a cryptographic collision-resistant hash function h or an appropriate key derivation function.

2. Polynomial Initialization: Initiate an underlying polynomial f of degree most 2 as $f(x)=a_0+a_1 x+a_2 x^2 \bmod p$.

3. Polynomial Randomization: The polynomial is partially randomized according to the number of fixed shares by choosing a random integer $a_2<p$ from $Z_p$, i.e., $a_2 \xleftarrow{s} Z_p$.

4. Secret-Reconstruction Condition: Set $a_0=Y$ to establish the secret reconstruction condition.

5. Fixed-Share Condition: Choose $a_1$ such that $f(1)=\Pi$, or $\Pi=a_0+a_1+a_2 \bmod p$, that is, set $a_1=\Pi-Y-a_2 \bmod p$ to establish the fixed share condition.

6. Final Sharing: Produce shares as $S=\{(i,f(i))|i\in[1:5]\}$, where the coefficients $a_0$, $a_1$ and $a_2$ of polynomial $f(x)=a_0+a_1 x+a_2 x^2 (\bmod p)$ are set as above.

It is to be appreciated that the polynomial randomization in step 3 is partial in the sense that not all coefficients are randomly selected, but the amount of randomization is specified according to the number of fixed shares. In particular, since secret sharing is performed with one fixed share, accordingly, one coefficient (in addition to coefficient $a_0$, which should be set to the secret), namely coefficient $a_1$, is left undetermined to be specified in step 5 with respect to the fixed share of step 1.

It is easy to see that, indeed, $s_1=(1,\Pi)=(1,h(\Pi))$ as needed for fixed share $s_1$, i.e., $s_1$ is associated to $p_1$'s password π. It also follows that, by construction, the password-based threshold secret sharing process 300 is ideal and perfectly private in at least one exemplary embodiment. First, share sizes are the same as in Shamir's scheme, namely, the size of an element in $Z_p$. Second, an adversary holding any two shares in S, that is, the evaluation of the polynomial f(x) on two values $i,j\in[1: n]$, gains no information about the split secret Y. Indeed, any two points $(i, Y_i), (j,Y_j)$, where $Y_i=f(i)$, $Y_j=f(j)$ and $ij\neq 0$, together with each candidate value $Y'\in Z_p$ of the secret uniquely determine one (and only one) polynomial $f'_{\pi,Y,Y'}(x)$ of degree at most 2 that is consistent with the conditions $f'_{\pi,Y,Y'}(0)=Y'$, $f'_{\pi,Y,Y'}(i)=Y_i$ and $f'_{\pi,Y,Y'}(j)=Y_j$. This new polynomial $f'_{\pi,Y,Y'}$ depends on π and Y (in addition to Y', of course), because $Y_i$ and $Y_j$ can be expressed as a linear combination of the coefficients $a_0=Y$, $a_1=h(\pi)-Y-a_2$ and $a_2$ of polynomial f, and accordingly the coefficients $a'_0=Y$, $a'_1=h(\pi)-Y'-a'_2$ and $a'_2$ of polynomial $f'_{\pi,Y}$ can also be expressed as linear combination of $h(\pi)$, Y and $a_2$, where $a_2 \xleftarrow{s} Z_p$ corresponds to the randomness used during the secret sharing phase. Finally, by construction, any of these p possible polynomials are equally likely; in particular, given secrets Y,Y' any polynomial $f'_{\pi,Y,Y'}$ is produced with probability exactly l/p, i.e., the probability of selecting a particular value for $a_2$. Thus, the exemplary scheme is perfectly private.

In the general case, the threshold password-based secret sharing scheme supports selection of k fixed shares (where k is appropriately bounded as described below in conjunction with FIG. 2), say shares $\{s_{I_1}, s_{I_2}, \ldots, s_{I_k}\} \subset S$, where each such share $s_{I_j}$ is associated with party's $p_{I_j}$ secret information or password $\pi_{I_j}$. The disclosed scheme is an extension of Shamir's (t,n) secret sharing scheme that remains ideal and perfectly private in at least one exemplary embodiment and operates as follows.

Figure 4:
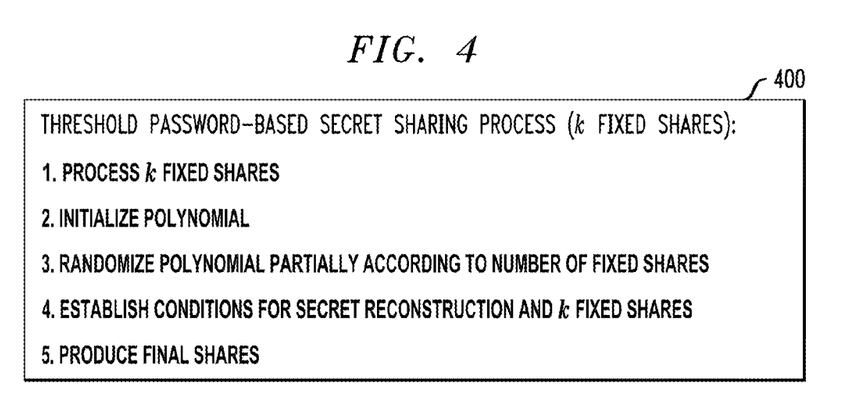

FIG. 4 is a flow chart illustrating an exemplary implementation of a password-based threshold secret sharing process 400 for the general case of k fixed shares. As shown in FIG. 4, the exemplary password-based threshold secret sharing process 400 comprises the following steps.

1. Fixed Shares: Choose (possibly randomly) k indices $\{I_1, I_2, \ldots, I_k\} \subset [1:n]$ that will correspond to the fixed shares, where $0 \leq k < t-1$. For each such chosen index $I_j$, map password $\pi_{I_j}$ to an element $\Pi_{I_j} = h(\pi_{I_j}) \in \mathbb{Z}_p$ by applying an appropriate compressed-range function h: $\{0,1\}^* \to \{\mathbb{Z}_p\}$. Here, function h may be a cryptographic collision-resistant hash function h or an appropriate key derivation function.

2. Polynomial Initialization: Initiate an underlying polynomial f of degree at most t−1 as $f(x) = a_0 + a_1 x + \ldots + a_{t-1} x_{t-1}$ mod p.

3. Polynomial Randomization: Choose independently at random t−k−1>0 integers $a_{k+1}, \ldots, a_{t-1}$ from $\mathbb{Z}_p$, i.e., $a_i \xleftarrow{s} \mathbb{Z}_p$, for $i \in [k+1:t-1]$.

4. Condition Enforcement:

(a) Form set of equations $E = \{E_0, E_2, \ldots, E_k\}$, each of the form $$Y_x = f(x) = a_0 + \sum_{1 \leq i \leq t-1} a_i x^i \mod p,$$

in 1-1 correspondence to the following conditions on:

* Secret Reconstruction: $Y = f(0) \triangleq Y_0$;
* Fixed Shares: $\Pi_{I_j} = f(I_j) \triangleq Y_{I_j}$, for each index in $\{I_1, I_2, \ldots, I_k\}$.

(b) View equations E as system $Y = A \cdot I$, where $Y = [Y_0 \ Y_{I_1} \ldots Y_{I_k}]^T$, $I = [a_0 \ a_1 \ldots a_k]^T$ and A takes the form $A = [R \ S]$ as the following matrix:

$$A = \begin{bmatrix} 1 & 0 & \ldots & 0 & \ldots & 0 \\ 1 & I_1 & \ldots & I_1^k & \ldots & I_1^{t-1} \\ \vdots & & & & & \\ 1 & I_k & \ldots & I_k^k & \ldots & I_k^{t-1} \end{bmatrix},$$

set $\bar{I} = [a_{k+1} \ a_{k+2} \ldots a_{t-1}]^T$ and finally set $I = R^{-1} \cdot (Y - S \cdot \bar{I})$ to establish the above secret reconstruction and fixed shares conditions.

5. Final Sharing:

(a) Produce shares as $S = \{(i, f(i)) | i \in [1:n]\}$, where the coefficients $a_0, a_1, \ldots a_{t-1}$ of polynomial $f(x) = a_0 + a_1 x + \ldots + a_{t-1} x^{t-1}$ mod p are set as above (in step 4(b)).

(b) Provide party $p_i$ with share (i,f(i)).

It is to be appreciated that the polynomial randomization in step 3 is partial in the sense that not all coefficients are randomly selected, but the amount of randomization is specified according to the number of fixed shares. In particular, since secret sharing is performed with k fixed share, accordingly, k coefficients (in addition to coefficient $a_0$, which should be set to the secret), namely coefficients $a_1$, $a_2, \ldots a_k$, are left undetermined to be specified in step 4(b) with respect to the fixed shares of step 1. It should also be noted that the selection of which exact subset of such k coefficients will be not randomized in step 3 but only specified in step 4(b) can be arbitrary without affecting the correctness or security of process 400. In particular, if step 3 randomizes an arbitrary given subset of t−k−1 coefficients, the remaining k−1 coefficients (including coefficient $a_0$) can be set in a way that still establishes the secret reconstruction and fixed shares conditions of step 4(a) simply by prepending step 4(b) with the following additional two steps of: (A) applying the appropriate permutation p(.) over (the rows of) the coefficients vector $[I \ \bar{I}]^T$ so that coefficients $a_0, a_1, \ldots a_{t-1}$ appear in the top k+1 positions of the permuted vector (e.g., by appropriately swapping pairs of coefficients in the vector), and (B) applying the same permutation p(.) over matrix $A = [R \ S]$ in a column-wise manner, that is, by treating columns as a whole and then permuting matrix A over its one "row" of columns (e.g., by appropriately swapping pairs of columns in the matrix A). Then step 4(b) can be executed as exactly specified above to set the arbitrary subset of remaining k+1 coefficients that were not specified in step 3.

The process 400 above follows the structure of the previously discussed example. The underlying polynomial f (x) is fully defined by t equations $E' = E \cup \{E_{k+1}, E_{k+2}, \ldots, E_{t-1}\}$ of the form as in step 4(a), which can be viewed as system $[Y \ \bar{Y}]^T = [A \ \bar{A}]^T \cdot [I \ \bar{I}]$, where $\bar{Y} = [Y_{k+1}, Y_{k+2} \ldots Y_{k-1}]^T$, $$\bar{A} = \begin{bmatrix} 1 & I_{k+1} & \ldots & I_{k+1}^k & \ldots & I_{k+1}^{t-1} \\ 1 & I_{k+2} & \ldots & I_{k+2}^k & \ldots & I_{k+2}^{t-1} \\ \vdots & & & & & \\ 1 & I_{t-1} & \ldots & I_{t-1}^k & \ldots & I_{t-1}^{t-1} \end{bmatrix},$$

and $\bar{I}$ as defined above in step 4(b). Then, step 3 randomly sets t−k−1 coefficients (the remaining degrees of freedom of the randomness of the scheme given the k+1 conditions related to secret reconstruction and fixed shares) and step 4(b) essentially solves the system by computing the remaining k+1 unspecified coefficients in I. Note that matrix R is invertible as a Vandermonde matrix. Note that matrix R remains invertible even if a permutation p(.) is applied over matrix A just prior to step 4(b) to allow randomization of an arbitrary subset of coefficients in step 3, because A is also a Vandermonde matrix. This proves the correctness of the disclosed process 400, in at least one exemplary embodiment.

Moreover, it is possible to show that the disclosed threshold password-based secret sharing scheme 400 is also perfectly private in at least one exemplary embodiment by extending the arguments given above in conjunction with FIG. 3 to the general case. Again, an attacker holding t−1 points of the polynomial f(x) will determine, for each candidate secret Y', a unique polynomial f'(x) (that depends on Y, Y' and all fixed shares/passwords), and each one of these p polynomials can occur with the same probability; the only difference in the general case is that this probability is now $1/p^{t-k-1}$.

For k=0, the disclosed threshold password-based secret sharing scheme 400 instantiates to exactly the standard Shamir's threshold scheme.

Secret Reconstruction

In at least one exemplary implementation of the threshold password-based secret sharing scheme, secret reconstruction is identical to the one in the conventional Shamir's threshold scheme, where Lagrange's polynomial interpolation is used over (at least) t shares of sharing S to recover secret $Y=a_0$. Specifically, by interpolating t shares in S, t coefficients $[a'_0 \ a'_1 \ldots a'_{t-1}]$ of a corresponding polynomial f'(x) of degree at most t−1 are computed, where the uniqueness of the Interpolation Theorem guarantees that $[a'_0 \ a'_1 \ldots a'_{t-1}]=[I \ I]$ because polynomials f,f' are equal since they agree on t points and are of degree at most t−1.

Order-Specific Share Release

In a realistic application of the exemplary threshold password-based secret sharing scheme, a number of t shares comprising a minimal authorized set may be desired to be obtained in some specific predefined order. For example, in the above example for one fixed share, it may be desirable that the shares corresponding to authorized set $\{p_2, p_3, p_4\}$ are obtained according to sequence $(p_2, p_4, p_3)$, meaning that the entity reconstructing the secret is required to first obtain share $s_2$, then share $s_4$ and then share $s_3$. Such specific obtaining of shares can be enforced by employing encryption-based access-control techniques (e.g., similar to those disclosed in U.S. patent application Ser. No. 14/319,276, filed Jun. 30, 2014, entitled "System and Method for Key Material Protection on Devices Using a Secret Sharing Scheme" (Now U.S. Pat. No. 9,461,821)), where a share may be stored at a party in an encrypted form, wrapped by one (or more) other share(s) (i.e., encrypted under (a key derived by) another share), and where release of a wrapped share by a party may require the unwrapping of the share. For example, in the above example for one fixed share, $p_4$ may store $E_{g(s_2)}(s_4)$ and $p_4$ may store $E_{g(s_4)}(s_3)$ or $E_{g(s_2)}(E_{g(s_4)}(s_3))$, so that release of $s_4$ and $s_3$ is contingent on the availability of $s_2$ and respectively $s_4$ or $\{s_2, s_4\}$, where g(.) is an appropriate cryptographic hash function or an appropriate key-derivation function.

Generic Password-Based Secret Sharing Scheme

Consider the general case where one or more shares are selected according to some predetermined fixed values. In at least one exemplary implementation, the disclosed generic password-based secret sharing scheme remains ideal, since each primary share is smaller than a derived share and since any derived share has the same size as the size of the secret, and also computationally private, due to the use of encryption for computing the derived shares in each additive secret sharing.

Secret Sharing

Let AS be a monotone access structure and consider only its minimal authorized sets $A_i$, each denoting a minimal set of parties that should suffice for secret reconstruction (but where any proper subset of $A_i$ does not suffice). Let $AS_k$ denote the support of party $p_k$, that is, the collection of minimal authorized sets that party $p_k$ belongs to. Let Y be the secret to be shared, drawn from the domain of finite field $Z_p$ of prime order p. Let $E_{(.)}(.)$ be a semantically-secure encryption scheme with key space $\{0,1\}^\kappa$, for some security parameter κ, and range (i.e., ciphertext space) $Z_p$. The semantically-secure encryption scheme may be embodied, for example, using a keyed pseudorandom function (PRF).

Figure 5:
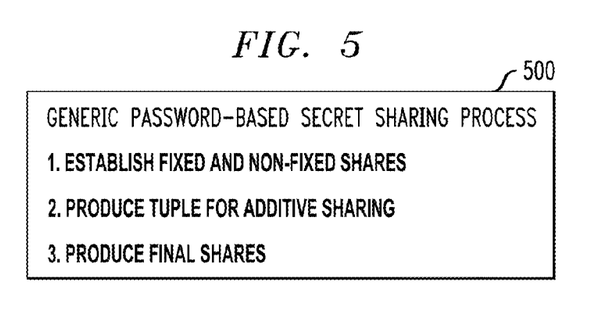
FIG. 5 is a flow chart illustrating an exemplary implementation of a generic password-based secret sharing scheme.

FIG. 5 is a flow chart illustrating an exemplary implementation of a generic password-based secret sharing scheme 500. As shown in FIG. 5, the exemplary generic password-based secret sharing process 500 comprises the following steps.

1. Primary Shares:
(a) Fixed Shares:
i. Choose (possibly randomly) k indices $I=\{I_1, I_2, \ldots I_k\} \subset [1:n]$ that will correspond to the fixed primary shares, where $0 \leq k \leq n$.
ii. For each $I_j \in I$, map password $\pi_{I_j}$ to bit string $\Pi_{I_j}=h(\pi_{I_j})$ by applying an appropriate compressed-range function h: $\{0,1\}^* \rightarrow \{0,1\}^\kappa$ and set $s_{I_j}=\Pi_{I_j}$. Here, function h must be a cryptographic collision-resistant hash function h or an appropriate key derivation function.

It is again noted that the fixed shares 220 also comprise a κ-bit string. While the bits of the κ-bit string of the non-fixed shares 230 are randomly selected, the bits of the κ-bit string of the fixed shares 220 are selected in accordance with the provided predetermined fixed values 210.

(b) Non-Fixed Shares: For each $k \neq I$, choose at random a κ-bit string $s_k$, i.e., set $s_k \xleftarrow{s} \{0,1\}^\kappa$.

2. Additive Sharing: For each minimal authorized set $A_i=\{p_{i_1}, p_{i_2}, \ldots p_{i_l}\}$ produce tuple $T_i=(r_i, M_i)$, where $r_i$ is a unique nonce (i.e., it has never been used before and will not be later), $M_i$ is the masked version of secret Y for set $A_i$, computed as follows:

$$M_i = E_{s_{i_1}}(r_i) \oplus E_{s_{i_2}}(r_i) \oplus \ldots \oplus E_{s_{i_\ell}}(r_i) \oplus Y \bmod p,$$

and $\oplus$ is the addition operation in $Z_p$. Note that the above equation can be viewed in two equivalent ways: (1) as the masking of secret Y to masked version $M_i$, using l masks (one for each party in set $A_i$), or (2) as the (l+1, l+1) additive sharing of secret Y, where $M_i$ is viewed as a special additive share not necessarily associated to a particular party in set $A_i$.

3. Final Sharing:
(a) Produce final shares as $$S=\{(s_k, a_k) | k \in [1:n]\},$$

where $s_k$ are primary shares as computed in step 1 and $a_k$ is auxiliary information related to the additive sharing of any minimal authorized set in party's $p_k$ support, set as:

$$a_k = \{T_i | A_i \in AS_k\}.$$

(b) Provide party $p_k$ with final share $(s_k, a_k)$.
(c) Optionally, provide the reconstructor, the entity responsible for management of AS and secret reconstruction, with all tuples $\{T_i | A_i \in AS\}$ computed in step 2.

Then, in a basic reconstruction configuration, the members of a given authorized set $A_i$ can decrypt $M_i$ in tuple $T_i$ to jointly obtain Y and without a reconstructor entity, by incrementally removing, i.e., each party one by one, starting from the masked version $M_i$, the mask values of the form $E_{s_{i_j}}(r_i)$ from the current masked version of Y, to finally recover (unmask) Y. Note that the basic reconstruction configuration does not require the optional step 3(c) of the exemplary generic password-based secret sharing process 500 described above. Note that by the security properties of the encryption scheme (or by viewing each derived share of an additive sharing as a pseudo random function (PRF) evaluation), the masking of the secret in each tuple is performed independently of other tuples, since nonce values are unique per tuple, and moreover, the parties in any unauthorized set collectively holds masks that are uniformly distributed and independent of the secret, since these players are necessarily missing at least one mask term of $M_i$, which is uniformly distributed over the secret domain (by the properties of the encryption scheme). Thus, the disclosed scheme is computationally private in at least one exemplary embodiment.

Secret Reconstruction

In addition to the basic reconstruction configuration described above, where parties in a given authorized set jointly unmask the secret, the disclosed generic password-based secret sharing scheme may use alternative configurations that allow secret reconstruction by an entity that is distinct from the parties in relation to the optional step 3(c) of the exemplary generic password-based secret sharing process 500 described above. Specifically, the auxiliary information portion of a party's share may only include the nonce values used in the additive sharing of the tuples related to the party's support $AS_k$, or even be empty (include no information at all). Accordingly, the secret reconstruction process for secrets split by the exemplary generic password-based secret sharing process 500 described above should be appropriately tuned to operate in two corresponding configurations. With these configurations, the parties either individually compute and report their derived shares to the reconstructor, the entity performing the secret reconstruction in relation to the optional step 3(c), either on a request sent to them by this entity or after one or more parties in this set initiate a reconstruction request sent to this entity, or, respectively, they respond to mask-value queries issued to them by this entity, where the queries specify a given nonce over which the requested derived shares must be computed.

Alternatively, the disclosed generic password-based secret sharing scheme can be modified to allow secret reconstruction jointly by the parties in a given authorized set, without requiring the optional step 3(c) of the exemplary generic password-based secret sharing process 500 described above, by applying additive sharing in a different manner so that the masked version $M_i$ of the secret Y is the secret Y itself. Specifically, the additive sharing for authorized set $A_i$ is performed subject to a reconstruction condition $Y = \oplus_{1 \leq j \leq l} R_{i_j}$, where the additive mask shares for l-1 parties are of the form $R_{i_j} = E_{s_{i_j}}(r_i)$, that is, they are derived shares as above, but the additive share of exactly one party $p_k$ in $A_i$ is restricted by the above reconstruction condition and, thus, is independent of the party's primary share and not a derived share by the party's primary share. This additive share then must be provided to party $p_k$ as part of the final share provided to this party. The selection of this one party $p_k$ may be random or according to some criteria based on which parties in $A_i$ select their primary shares to be fixed. In this configuration, there is no need to store the masked version $M_i$ of the secret, since the secret can be unmasked solely based on the parties' additive mask shares, and there is no need to employ any auxiliary information in the final shares provided to the parties.

Order-Specific Share Release

As with the exemplary threshold password-based secret sharing scheme, the generic password-based secret sharing scheme can additionally be extended to allow for order-specific share release. This can be achieved by controlling the plaintext $r_i$ that is wrapped (encrypted) in the formation of the masked version $M_i$ of the secret to be further dependent on the required releasing rank that corresponding additive share is assigned by a specific release ordering. Such dependencies can be captured by employing a keyed collision-resistant cryptographic hash function or a pseudo-random function $g_{(.)}(.)$. In particular, tuple $T_i = (r_{i_0}, M_i)$ now includes an initial nonce value $r_{i_0}$ and a new masked version of the secret for set $A_i$ of size l, computed as follows:

$$M_i = E_{s_{i_1}}(r_{i_1}) \oplus E_{s_{i_2}}(r_{i_2}) \oplus \ldots \oplus E_{s_{i_\ell}}(r_{i_\ell}) \oplus Y \bmod p,$$

and a given specific release ordering is captured by appropriately chaining the individual nonce values $r_{i_j}$, $1 \leq j \leq l$, through function $g_{(.)}$. For instance, ordering 1, 2, ..., l is captured through individual nonce values being chained as $r_{i_1} = r_{i_0}$, $r_{i_2} = g_{s_1}(r_{i_1})$, $r_{i_3} = g_{s_{i_2}}(r_{i_2})$, ..., $r_{i_l} = g_{i_{l-1}}(r_{i_{l-1}})$, where generally (t+1)-ranked nonce $r_{i_j}$ for party $p_{i_j} \in A_i$ is computed by t-ranked party $p_{i_t} \in A_i$ as $r_{i_j} = g_{s_{i_t}}(r_{i_t})$ and provided to $p_{i_j}$ by $p_{i_1}$ either directly or through the entity performing the secret reconstruction.

CONCLUSION

The foregoing applications and associated embodiments should be considered as illustrative only, and numerous other embodiments can be configured using the secret sharing techniques disclosed herein, in a wide variety of different cryptography applications.

It should also be understood that password-based secret sharing schemes, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 6:
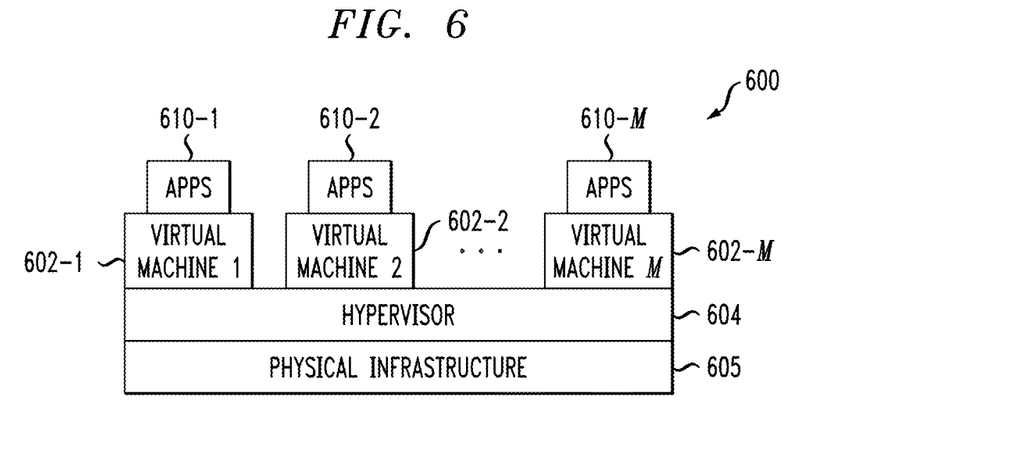
FIG. 6 illustrates an exemplary processing platform that may be used to implement at least a portion of one or more embodiments of the invention comprising a cloud infrastructure.

Referring now to FIG. 6, one possible processing platform that may be used to implement at least a portion of one or more embodiments of the invention comprises cloud infrastructure 600. The cloud infrastructure 600 in this exemplary processing platform comprises virtual machines (VMs) 602-1, 602-2, ... 602-M implemented using a hypervisor 604. The hypervisor 604 runs on physical infrastructure 605. The cloud infrastructure 600 further comprises sets of applications 610-1, 610-2, ... 610-M running on respective ones of the virtual machines 602-1, 602-2, ... 602-M under the control of the hypervisor 604.

The cloud infrastructure 600 may encompass the entire given system or only portions of that given system, such as one or more of client, servers, controller, authentication server or relying server in the system.

Although only a single hypervisor 604 is shown in the embodiment of FIG. 6, the system may of course include multiple hypervisors each providing a set of virtual machines using at least one underlying physical machine.

An example of a commercially available hypervisor platform that may be used to implement hypervisor 604 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system.

Figure 7:
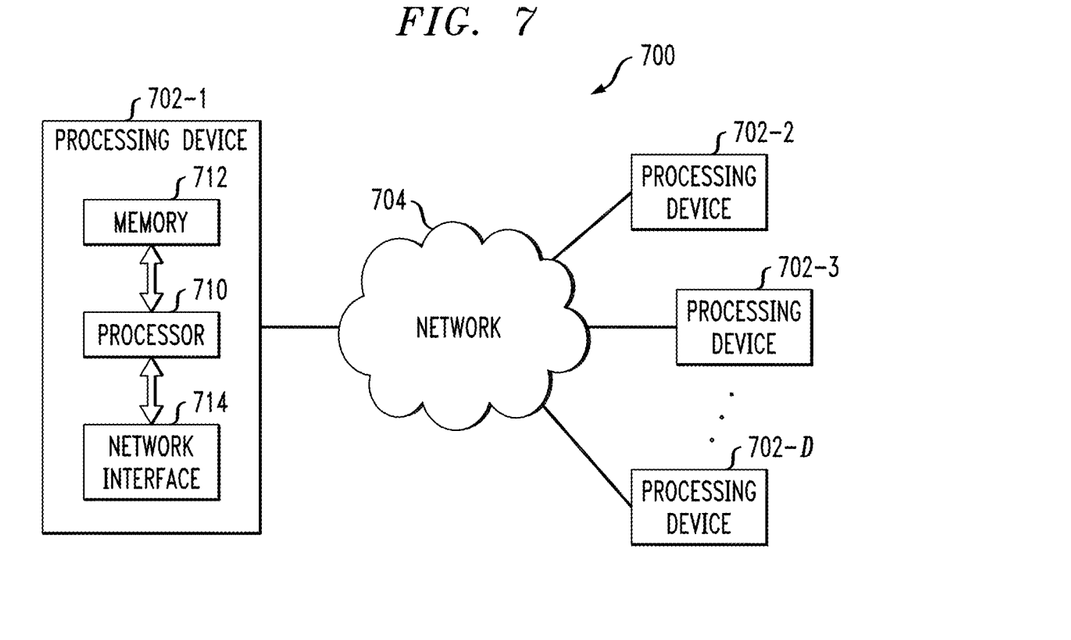
FIG. 7 illustrates another exemplary processing platform that may be used to implement at least a portion of one or more embodiments of the invention.

Another example of a processing platform is processing platform 700 shown in FIG. 7. The processing platform 700 in this embodiment comprises at least a portion of the given system and includes a plurality of processing devices, denoted 702-1, 702-2, 702-3, . . . 702-D, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "computer program product" having executable computer program code embodied therein, may comprise random access memory (RAM), read only memory (ROM) or other types of memory, in any combination.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 6 or 7, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed cryptography using distinct value sets as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    obtaining a secret, wherein said secret protects at least one data item;
    obtaining a fixed value from at least one party, wherein said fixed value is distinct from said secret;
    setting, using at least one processing device, at least one polynomial coefficient of a polynomial employed by a polynomial-based secret sharing scheme to a value that depends on said fixed value and said secret, wherein said at least one polynomial coefficient has a degree of at least one;
    applying, using said at least one processing device, said polynomial-based secret sharing scheme to said secret to obtain a plurality of secret shares, wherein said plurality of secret shares comprises at least one fixed share derived from said at least one polynomial coefficient; and
    providing one or more of said plurality of secret shares to at least one device during a secret sharing phase, such that said secret is reconstructed during a secret reconstruction phase only when a predefined minimum number of said plurality of secret shares are provided to one or more authentication servers.

2. The method of claim 1, wherein said fixed value comprises one or more of secret information related to said at least one party and a password of said at least one party.

3. The method of claim 1, wherein said at least one polynomial coefficient depends on a value obtained by applying a compressed-range function to said fixed value.

4. The method of claim 1, wherein a different one of said fixed values is obtained from each of a plurality of parties and wherein said step of setting at least one polynomial coefficient of a polynomial comprises setting a plurality of said polynomial coefficients in a manner that depends on said fixed values obtained from said plurality of parties and said secret.

5. The method of claim 1, wherein said at least one polynomial coefficient further depends on a random value.

6. The method of claim 1, further comprising the step of setting a second polynomial coefficient of said polynomial to be equal to said secret.

7. The method of claim 1, wherein t shares comprise a minimal authorized set needed for said reconstruction of said secret and wherein said t shares must be obtained in a predefined order to reconstruct said secret.

8. A non-transitory machine-readable recordable storage medium, wherein one or more software programs when executed by one or more processing devices implement the following steps:

obtaining a secret, wherein said secret protects at least one data item;

obtaining a fixed value from at least one party, wherein said fixed value is distinct from said secret;

setting, using at least one processing device, at least one polynomial coefficient of a polynomial employed by a polynomial-based secret sharing scheme to a value that depends on said fixed value and said secret, wherein said at least one polynomial coefficient has a degree of at least one;

applying, using said at least one processing device, said polynomial-based secret sharing scheme to said secret to obtain a plurality of secret shares, wherein said plurality of secret shares comprises at least one fixed share derived from said at least one polynomial coefficient; and providing one or more of said plurality of secret shares to at least one device during a secret sharing phase, such that said secret is reconstructed during a secret reconstruction phase only when a predefined minimum number of said plurality of secret shares are provided to one or more authentication servers.

9. A secret sharing method, comprising:

obtaining a secret, wherein said secret protects at least one data item;

obtaining a fixed value from at least one party, wherein said fixed value is distinct from said secret;

selecting, using at least one processing device, at least one fixed share of a plurality of shares employed by an additive secret sharing scheme that splits said secret into said plurality of shares needed for reconstruction of said secret, wherein said at least one fixed share depends on a value obtained by applying a compressed-range function to said fixed value;

setting, using said at least one processing device, at least one masked version of said secret employed by said additive secret sharing scheme, wherein said at least one masked version of said secret depends on said at least one fixed share; and providing one or more of said plurality of shares to at least one device during a secret sharing phase, such that said secret is reconstructed during a secret reconstruction phase only when a predefined minimum number of said plurality of shares are provided to one or more authentication servers.

10. The method of claim 9, wherein said fixed value comprises one or more of secret information related to said at least one party and a password of said at least one party.

11. The method of claim 9, further comprising the step of selecting one or more non-fixed shares for one or more additional parties, wherein said one or more non-fixed shares comprise a randomly selected κ-bit string.

12. The method of claim 11, further comprising the steps of providing said fixed share to said at least one party; and providing said one or more non-fixed shares to said corresponding one or more additional parties.

13. The method of claim 9, wherein said step of setting at least one masked version of said secret further comprises a result of an additive operation applied to an encrypted version of a unique nonce associated with each of said plurality of shares needed for said reconstruction of said secret.

14. The method of claim 13, wherein said unique nonce associated with each of said plurality of shares masks said secret for each of said plurality of shares independently of other shares.

15. The method of claim 9, wherein each party in a minimal set of parties needed to reconstruct said secret can decrypt said at least one masked version of said secret by incrementally removing one or more mask values from a current masked version of said secret to recover said secret.

16. The method of claim 9, wherein t shares comprise a minimal authorized set needed for said reconstruction of said secret and wherein said t shares must be obtained in a predefined order to reconstruct said secret.

17. The method of claim 9, further comprising the step of providing one or more of a derived share for reconstruction of said secret and a response to a mask value query performed to reconstruct said secret.

18. The method of claim 9, further comprising the step of providing a plurality of parties in a given authorized set with auxiliary information comprising a unique nonce and said at least one masked version of said secret, wherein said plurality of parties in said given authorized set jointly unmask the secret.

19. The method of claim 9, further comprising the step of providing a plurality of parties in a given authorized set with auxiliary information comprising a unique nonce, wherein each of said plurality of parties in said given authorized set provide a derived share to a reconstructor entity possessing said at least one masked version of said secret for reconstruction of said secret.

20. The method of claim 9, wherein each of said plurality of parties in said given authorized set provide a derived share for a particular unique nonce to a reconstructor entity for reconstruction of said secret.

21. The method of claim 9, wherein said at least one masked version of said secret comprises said secret, and wherein one or more of said plurality of parties in said given authorized set derive a corresponding additive share and combine them using an additive operation to obtain the secret.

22. A non-transitory machine-readable recordable storage medium, wherein one or more software programs when executed by one or more processing devices implement the following steps:

obtaining a secret, wherein said secret protects at least one data item;

obtaining a fixed value from at least one party, wherein said fixed value is distinct from said secret;

selecting, using at least one processing device, at least one fixed share of a plurality of shares employed by an additive secret sharing scheme that splits said secret into said plurality of shares needed for reconstruction of said secret, wherein said at least one fixed share depends on a value obtained by applying a compressed-range function to said fixed value;

setting, using said at least one processing device, at least one masked version of said secret employed by said additive secret sharing scheme, wherein said at least one masked version of said secret depends on said at least one fixed share; and providing one or more of said plurality of shares to at least one device during a secret sharing phase, such that said secret is reconstructed during a secret reconstruction phase only when a predefined minimum number of said plurality of shares are provided to one or more authentication servers.

23. An apparatus, comprising:
a memory; and
at least one processing device, coupled to the memory, operative to implement the following steps:
obtaining a secret, wherein said secret protects at least one data item;
obtaining a fixed value from at least one party, wherein said fixed value is distinct from said secret;
setting, using said at least one processing device, at least one polynomial coefficient of a polynomial employed by a polynomial-based secret sharing scheme to a value that depends on said fixed value and said secret, wherein said at least one polynomial coefficient has a degree of at least one;
applying, using said at least one processing device, said polynomial-based secret sharing scheme to said secret to obtain a plurality of secret shares, wherein said plurality of secret shares comprises at least one fixed share derived from said at least one polynomial coefficient; and
providing one or more of said plurality of secret shares to at least one device during a secret sharing phase, such that said secret is reconstructed during a secret reconstruction phase only when a predefined minimum number of said plurality of secret shares are provided to one or more authentication servers.

24. The apparatus of claim 23, wherein said at least one polynomial coefficient depends on a value obtained by applying a compressed-range function to said fixed value.

25. An apparatus, comprising:
a memory; and
at least one processing device, coupled to the memory, operative to implement the following steps:
obtaining a secret, wherein said secret protects at least one data item;
obtaining a fixed value from at least one party, wherein said fixed value is distinct from said secret;
selecting, using said at least one processing device, at least one fixed share of a plurality of shares employed by an additive secret sharing scheme that splits said secret into said plurality of shares needed for reconstruction of said secret, wherein said at least one fixed share depends on a value obtained by applying a compressed-range function to said fixed value;
setting, using said at least one processing device, at least one masked version of said secret employed by said additive secret sharing scheme, wherein said at least one masked version of said secret depends on said at least one fixed share; and
providing one or more of said plurality of shares to at least one device during a secret sharing phase, such that said secret is reconstructed during a secret reconstruction phase only when a predefined minimum number of said plurality of shares are provided to one or more authentication servers.

* * * * *